United States Patent
McMillan et al.

(10) Patent No.: US 10,016,864 B2
(45) Date of Patent: Jul. 10, 2018

(54) SYSTEM AND METHOD OF SECURING A COMPONENT IN POSITION FOR MACHINING USING A FIXTURE ASSEMBLY

(71) Applicant: THE BOEING COMPANY, Chicago, IL (US)

(72) Inventors: Daniel James McMillan, Edmonds, WA (US); Andrew Paul Davidson, Everett, WA (US)

(73) Assignee: The Boeing Company, Chicago, IL (US)

( * ) Notice: Subject to any disclaimer, the term of this patent is extended or adjusted under 35 U.S.C. 154(b) by 682 days.

(21) Appl. No.: 14/588,468

(22) Filed: Jan. 2, 2015

(65) Prior Publication Data

US 2016/0194093 A1    Jul. 7, 2016

(51) Int. Cl.
*B23P 11/00*    (2006.01)
*B23Q 3/06*    (2006.01)

(52) U.S. Cl.
CPC .................... *B23Q 3/062* (2013.01)

(58) Field of Classification Search
CPC ......... B23P 11/00; B23P 11/027; B23P 13/00; B23P 19/04; B23P 19/10
See application file for complete search history.

(56) References Cited

U.S. PATENT DOCUMENTS

| 7,798,285 | B2 | 9/2010 | Chiou | |
|---|---|---|---|---|
| 2003/0213113 | A1* | 11/2003 | McMillan | B63B 21/502 29/281.1 |
| 2006/0123612 | A1* | 6/2006 | Wiseman | B23Q 3/18 29/281.1 |
| 2012/0074631 | A1* | 3/2012 | Dagenais | B23K 37/0217 269/37 |
| 2013/0126265 | A1 | 5/2013 | Sternberger | |
| 2016/0201556 | A1* | 7/2016 | Kolvick | F01D 5/3007 29/888.012 |

* cited by examiner

*Primary Examiner* — Lee D Wilson
(74) *Attorney, Agent, or Firm* — Joseph M. Butscher; The Small Patent Law Group, LLC

(57) ABSTRACT

A fixture assembly is configured to securely retain a component, such as an acoustic inlet barrel. The fixture assembly includes at least one component-securing sub-assembly configured to be selectively positioned between a retracted position and a securing position. The component-securing sub-assembly securely retains the component in the securing position, and includes a plurality of component-securing members having outer gripping members that are configured to securely abut into an interior surface of the component in the securing position.

38 Claims, 10 Drawing Sheets

SYSTEM AND METHOD OF SECURING A COMPONENT IN POSITION FOR MACHINING USING A FIXTURE ASSEMBLY

BACKGROUND OF THE DISCLOSURE

Embodiments of the present disclosure generally relate to systems and methods for machining portions of an acoustic inlet barrel of an engine assembly, such as that of a jet aircraft.

Jet aircraft typically include one or more engines that may generate high levels of noise. For example, a fan case within a housing secured to a wing of an aircraft typically generates noise. Often, engine housings include one or more sound dampening structures that are used to absorb at least a portion of the noise generated by components of an engine. For example, an acoustic inlet barrel may be positioned at or proximate to an inlet of the engine housing upstream from a fan case.

Known acoustic inlet barrels are formed of composite materials, such as carbon-reinforced plastics, that are sandwiched around an acoustic core, such as a porous foam material. Often, an acoustic inlet barrel is formed of multiple pieces. For example, each acoustic inlet barrel may be formed of two or three pieces that are secured together through fasteners, such as bolts. The pieces are secured together to form the acoustic inlet barrel.

In order to secure the acoustic inlet barrel into a housing of an engine assembly, surfaces of the acoustic inlet barrel are machined so that they securely and precisely connect to portions of the housing. For example, an end surface of an acoustic inlet barrel is machined to securely and precisely connect to a lip joint or surface that connects to an outer surface of the housing. Similarly, an opposite end surface of the acoustic inlet barrel is machined to securely and precisely connect to an interior fan case within the housing. As can be appreciated, in order to accurately machine the surfaces of the acoustic inlet barrel, great care is taken to ensure that the acoustic inlet barrel is properly oriented and positioned prior to machining. In general, the process of identifying the proper surfaces for machining and accurately machining the surfaces is time and labor intensive. Moreover, because an initially-formed acoustic inlet barrel may have a degree of slack, surfaces of the acoustic inlet barrel may not be accurately machined. For example, during a machining process, portions of the acoustic inlet barrel may shift or otherwise move, which may lead to improperly machined surfaces.

Accordingly, a need exists for a system and method of positioning an acoustic inlet barrel prior to machining. Further, a need exists for a system and method of accurately machining surfaces of the acoustic inlet barrel.

SUMMARY OF THE DISCLOSURE

Certain embodiments of the present disclosure provide a fixture assembly configured to securely retain a component, such as an acoustic inlet barrel. The fixture assembly may include at least one component-securing sub-assembly configured to be selectively positioned between a retracted position (in which portions of the component are not securely connected to the component-securing sub-assembly) and a securing position (in which portions of the component are securely connected to the component-securing sub-assembly). The component-securing sub-assembly securely retains the component in the securing position, and may include a plurality of component-securing members having outer gripping members that are configured to securely abut into an interior surface of the component in the securing position.

In at least one embodiment, a lower component-securing sub-assembly is configured to securely engage a lower portion of the component in the securing position, and an upper component-securing sub-assembly is configured to securely engage an upper portion of the component in the securing position. In at least one embodiment, the component-securing members of the lower component-securing sub-assembly reside within a first plane, and the component-securing members of the upper component-securing sub-assembly reside within a second plane, which may be non-parallel with the first plane.

The fixture assembly may include a support base that supports the lower component-securing sub-assembly and the upper component-securing sub-assembly. One or more support beams may upwardly extend from the support base and connect to the upper component-securing sub-assembly. The support beam(s) separate the upper component-securing sub-assembly from the lower component-securing sub-assembly.

Each component-securing sub-assembly may include a fixed base connected to a rotatable ring. The plurality of component-securing members may be moveably secured between the fixed base and the rotatable ring. Rotational movement of the rotatable ring causes the component-securing members to radially move. Depending on the direction of rotation of the upper ring, the component-securing members may move radially outward or radially inward in relation to the fixed base and the rotatable ring.

In at least one embodiment, the rotatable ring may include a plurality of brackets having longitudinal channels that slidably retain a protuberance of a respective one of the plurality of component-securing members. Each bracket may be angled on the rotatable sing. Each bracket may have first and second ends. One of the first or second ends may be closer to an outer rim of the rotatable ring than the other of the first or second ends.

Each component-securing sub-assembly may include an engagement device that is configured to be engaged to move the component securing sub-assembly between the retracted and securing positions. In at least one embodiment, at least one tool may be removably secured to a portion of the component-securing sub-assembly. The tool is configured to engage the engagement device so that an individual may use the tool to control the engagement device. Alternatively, the engagement device may be operatively connected to a motor, such as a servo motor.

The fixture assembly may also include an indexer configured to engage a reciprocal feature formed in the component to locate the component in relation to the fixture assembly. In at least one embodiment, the indexer may include an extension beam that radially extends from an arcuate cuff secured to a portion of the fixture assembly, a clocking member extending from a distal end of the extension beam, and a registration pin secured to the clocking member. The registration pin is configured to be retained within a reciprocal hole formed in a portion of the component.

Certain embodiments of the present disclosure provide a machining system that may include a component, and a fixture assembly that is configured to securely retain the component. The fixture assembly may include at least one component-securing sub-assembly configured to be selectively positioned between a retracted position and a securing position. The component-securing sub-assembly securely retains the component in the securing position, and may include a plurality of component-securing members having outer gripping members that are configured to securely abut into an interior surface of the component in the securing position. The machining system may also include one or more machining devices positioned on a gantry. The fixture assembly is positioned on the gantry and the component is securely retained by the fixture assembly when the component-securing sub-assembly is positioned in the securing position.

Certain embodiments of the present disclosure provide a method of machining an acoustic inlet barrel. The method may include (a) positioning the acoustic inlet barrel around a fixture assembly, (b) orienting the acoustic inlet barrel in relation to the fixture assembly so that an indexer of the fixture assembly engages a reciprocal feature of the acoustic inlet barrel, (c) engaging one or more engaging devices in a securing direction to securely contact an inner surface of the acoustic inlet barrel with outer gripping members of component engaging members of the fixture assembly, (d) removing the indexer from the reciprocal feature of the acoustic inlet barrel after the engaging one or more engaging devices in a securing direction operation, (e) machining portions of the acoustic inlet barrel after the removing operation, (f) engaging the engaging devices in a retracting direction to retract the component engaging members away from the inner surface of the acoustic inlet barrel, and (g) removing the acoustic inlet barrel from the fixture assembly after the component engaging members are retracted.

DETAILED DESCRIPTION OF THE DISCLOSURE

Figure 1:
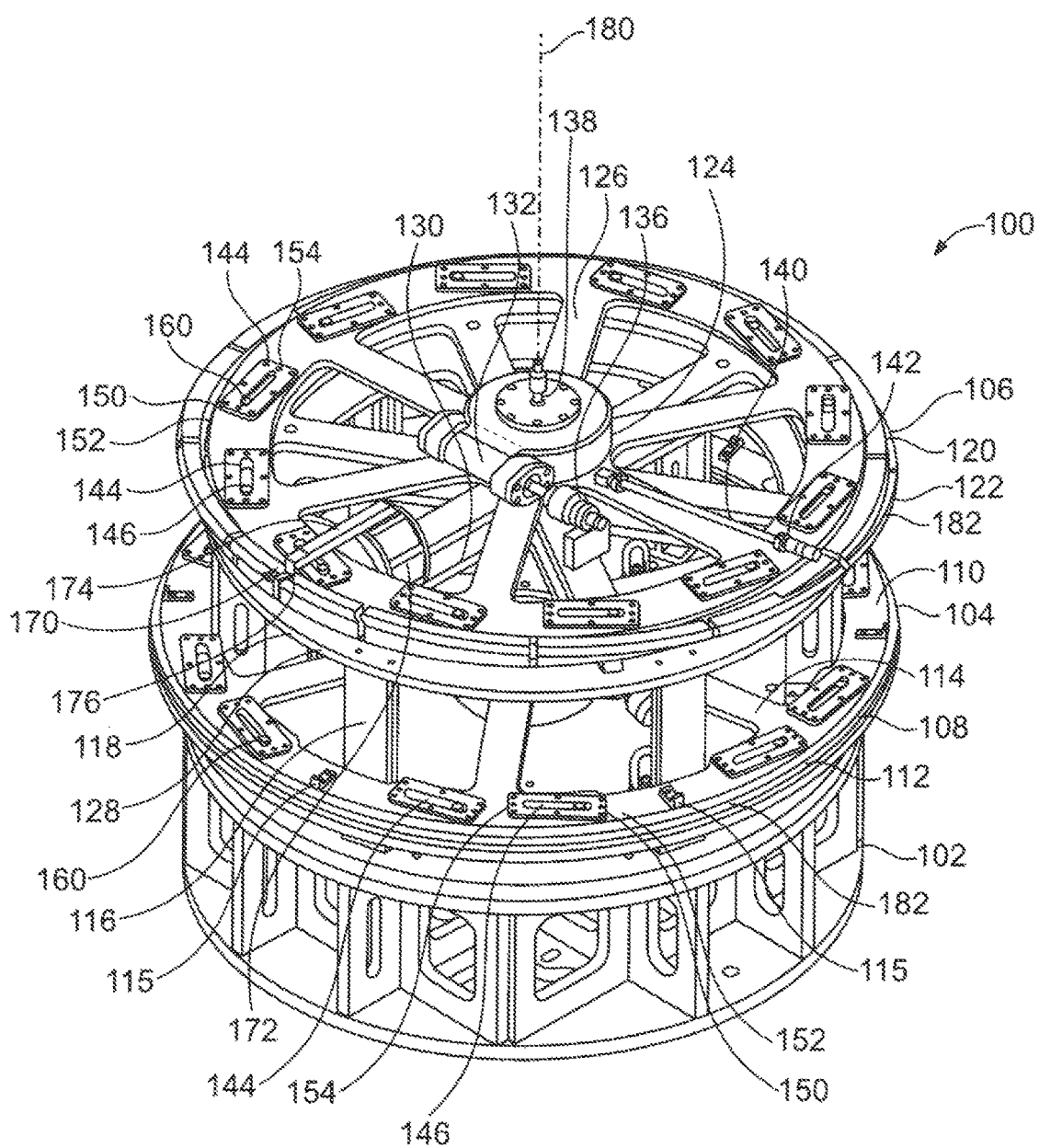
FIG. 1 illustrates a perspective top view of a fixture assembly, according to an embodiment of the present disclosure.

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a fixture assembly that is configured to securely retain a component, such as an acoustic inlet barrel, during a machining process. For example, the fixture assembly may be configured to securely retain a non-cylindrical acoustic inlet barrel.

The component may be a tubular or other such cylindrical component having an outer wall defining a central passage. The component may be an asymmetrically-shaped component having wall portions that differ in height, cross-section, and the like. For example, the component may include walls having a cross-sectional hour-glass shape that may be different at various locations of the component. Alternatively, the component may be a regularly-shaped, symmetrical cylinder having a central passage.

Embodiments of the present disclosure provide a fixture assembly that is configured to precisely, quickly, and repeatably hold or otherwise retain a complex, asymmetric hour-glass shaped component, such as an acoustic inlet barrel that is to be positioned within an aircraft engine. The fixture assembly may include upper and lower coaxially-aligned expanding rings or wheels having a fixed portion and an expanding portion, which may be configured to radially expand in relation to the fixed portion. The expanding portion may be configured to move in relation to the fixed portion by way of a cam interface, for example. The expanding portion may include gripping members, each of which may be tailored to conform to a shape of an inner surface of a component, such as an acoustic inlet barrel. Each gripping member may include an outer contacting portion that may be formed of a constant force-exerting material, such a rubber or an elastomeric material. Outer contacting portions of each expanding wheel may be disposed in non-parallel planes, for example.

The fixture assembly may also include one or more indexing features. Through use of the indexing features, the fixture assembly, which retains the component, may be positioned on a numerically-controlled system, such as bed, gantry, or the like, which may efficiently machine the component. The indexing feature(s) allow the numerically-controlled system to register the component in space and determine the exact position of surfaces to be machined, thereby streamlining the machining process.

Embodiments of the present disclosure are configured to accurately support and retain a complex-shaped component for post-autoclave machining. Embodiments decrease labor time and costs, and therefore increase a production rate of a component, such as an acoustic inlet barrel.

FIG. 1 illustrates a perspective top view of a fixture assembly 100, according to an embodiment of the present disclosure. The fixture assembly 100 includes a support base 102 (such as a riser), which supports a first or lower component-securing sub-assembly 104 and a second or upper component-securing sub-assembly 106. The support base 102 may be sized and shaped to elevate the component-securing sub-assemblies 104 and 106 to a desired height. Alternatively, the fixture assembly 100 may not include the support base 102.

The lower component-securing sub-assembly 104 includes a fixed annular base 108 connected to a rotatable upper ring 110, such an annular ring, disc, wheel, rim, or other circumferential structure. A plurality of moveable component-engaging members 112, such as wedges, teeth, plates, rims, arcuate frames, segments, or the like, are sandwiched between the base 108 and the rotatable upper ring 110. For example, twelve component-engaging members 112 may be positioned between the base 108 and the upper ring 110. Alternatively, the fixture assembly 100 may include more or less than twelve component-engaging members 112. The upper ring 110 may connect to an interior hub (hidden from view in FIG. 1) through one or more spokes 114. Alternatively, the upper ring 110 may be a solid disc, for example.

A plurality of support ledge clips 115 may be secured to an upper surface of the upper ring 110. The support ledge clips 115 are configured to support and retain a lower edge of a component, such as an acoustic inlet barrel, on the upper ring 110.

Interior support beams 116 may extend upwardly from the support base 102 within interior spaces between the spokes 114. The interior support beams 116 may extend from an upper surface of the support base 102 to a lower surface of a base 118 of the upper component-securing sub-assembly 106 and/or a support plate underneath the base 118.

The upper component-securing sub-assembly 106 includes the fixed base 118 connected to a rotatable upper ring 120, such an annular ring, wheel, disc, rim, or other circumferential structure. A plurality of component-engaging members 122, such as wedges, teeth, plates, rims, arcuate frames, segments, or the like, are sandwiched between the base 118 and the rotatable upper ring 120. For example, twelve component-engaging members 122 may be positioned between the base 118 and the upper ring 120. Alternatively, the fixture assembly 100 may include more or less than twelve component-engaging members 122. The upper ring 120 may connect to an interior hub 124 through one or more spokes 126. As shown, the fixed base 118 may include an outer rim 128 that connects to an interior hub through one or more spokes 130. Alternatively, the fixed base 118 may be a solid disc-shaped structure, for example.

Each of the respective lower and upper component-securing sub-assemblies 104 and 106 includes an operable engagement device 132, such as a scroll wheel, mounted to a top surface thereof. For example, the engagement device 132 of the upper component-securing sub-assembly 106 may be secured to the hub 124. Each engagement device 132 may include a slew ring bearing 136, which is configured to be engaged by a tool 140, such as a wrench. As shown, the tool 140 may be removably secured to an upper surface of the upper ring 120, such as through one or more resilient clips 142. An additional tool may be similarly secured to an upper surface of the upper ring 110. Optionally, the same tool 140 may be used to engage the engagement devices 132 of both the lower and upper component-securing sub-assemblies 104 and 106, respectively.

The upper component-securing sub-assembly 106 may also include a lead screw 138 positioned through a central axis. The lead screw 138 is configured to be engaged by a tool, such as the tool 140, in order to adjust the height of the upper component-securing sub-assembly 106 in relation to the lower component-securing sub-assembly 104. Alternatively, the fixture assembly 100 may not include the lead screw 138.

Each of the upper rings 110 and 120 includes a plurality of brackets 144 defining an interior longitudinal channel 146. The number of brackets 144 corresponds to the number of component-engaging members 112 and 122. As shown, each bracket 144 is angled with respect to the upper rings 110, such that one end 150 is proximate to an outer edge 152 of the upper rings 110 and 120, while an opposite end 154 angles inwardly toward a central axis of the respective upper rings 110 and 120. A protuberance 160 (such as a smooth, rounded post, tube, tab, stud, or the like) upwardly extends from each component-engaging member 112 and 122 and is slidably secured within a respective longitudinal channel 146.

An indexer 170 may extend from the fixed base 118 of the upper component-securing sub-assembly 106. For example, an arcuate cuff 172 may extend upwardly from the fixed base 118. An extension beam 174 may radially and outwardly extend from a top edge of the cuff 172. A clocking member 176 may extend from a distal end of the extension beam 174. The fixture assembly 100 may include additional indexers 170. For example, the upper component-securing sub-assembly 106 may include two or more indexers 170. Further, the lower component-securing sub-assembly 104 may also include one or more indexers. In operation, the indexer 170 is configured to properly index and align a component, such as an acoustic inlet barrel, onto the fixture assembly 100 so that a precise position and orientation of the component on the fixture assembly 100 is known.

Alternatively, the indexer 170 may be various other types of structures that may be used to index and register the component in relation to the fixture assembly 100. For example, the indexer 170 may be or include a pin outwardly and radially extending from the base 118 or the upper ring 120. In another embodiment, the indexer 170 may include a barb, clasp, latch, or the like that may extend from an extension beam, or from an outer edge portion of the base 118 or the upper ring 120. In another embodiment, the indexer 170 may be or include one or more arcuate ridges, fins, ledges, ribs, or the like extending from an edge portion of the base 118 or the upper ring 120. The arcuate structures are configured to be retained within one or more reciprocal slots, channels, divots, or the like formed in a portion of the component. Various other types of indexing structures and features may be used in place of the specific configuration of the indexer 170 shown in FIG. 1, for example.

The engagement devices 132 are configured to be engaged to operate to move the component-engaging members 112 and 122 between securely engaged and retracted positions. For example, as the tool 140 is used to rotate the slew ring bearing 136 of the upper component-securing sub-assembly 106 in an engaging direction (that is, a direction that causes the component-engaging members 122 to move into an internal surface of the component), the engagement device 132 rotates the upper ring 120 in relation to the fixed base 118. As the upper ring 120 rotates, the protuberances 160 of the component-engaging members 122 slide within the longitudinal channels 146 of the upper rings 120, thereby forcing the component-engaging members 122 to extend, translate, or otherwise move radially outward away from a central axis 180 of the fixture assembly 100. As such, the protuberances 160 within the longitudinal channels 146 provide a cam interface that translates the rotational movement of the upper ring 120 into a linear and/or radial movement of each of the component-engaging members 122. In this manner, the component-engaging members 122 may wedge, brace, or otherwise securely abut against interior surfaces of a component positioned around the fixture assembly 100. In order to retract the component-engaging members 122, the tool 140 is used to rotate the slew ring bearing 136 of the engagement device 132 in an opposite direction (for example, a retracting direction that causes the component-securing members 122 to retract away from the internal surface of the component and back toward the central axis 180).

As shown, each component-engaging members 112 and 122 may include an arcuate outer gripping member 182 (such as flexible and resilient rim segments, rail segments, lip segments, tube segments, and/or the like), which may be formed of a constant force-exerting material, such as a rubber, an elastomeric material, a resilient foam, and/or the like. The outer gripping member 182 may extend radially outward from an outer edge of each component-engaging member 112 and 122. The constant force-exerting material is configured to be compressed into an interior surface of a component, and exert a constant force therein during compression.

The arcuate outer gripping members 182 of the upper component-engaging members 122 may be positioned within a first plane that may be non-parallel with a second plane in which the arcuate outer gripping members 182 of the lower component-engaging members 112. For example, the upper component-engaging members 122 may be canted with respect to the lower component-engaging members 112. The canted relationship between the respective lower and upper component-engaging members 112 and 122 may be tailored to accommodate the shape of a particular component, such as an acoustic inlet barrel, which may include non-parallel ends. Alternatively, the lower and upper component-engaging members may reside within planes that are parallel to one another.

Figure 2:
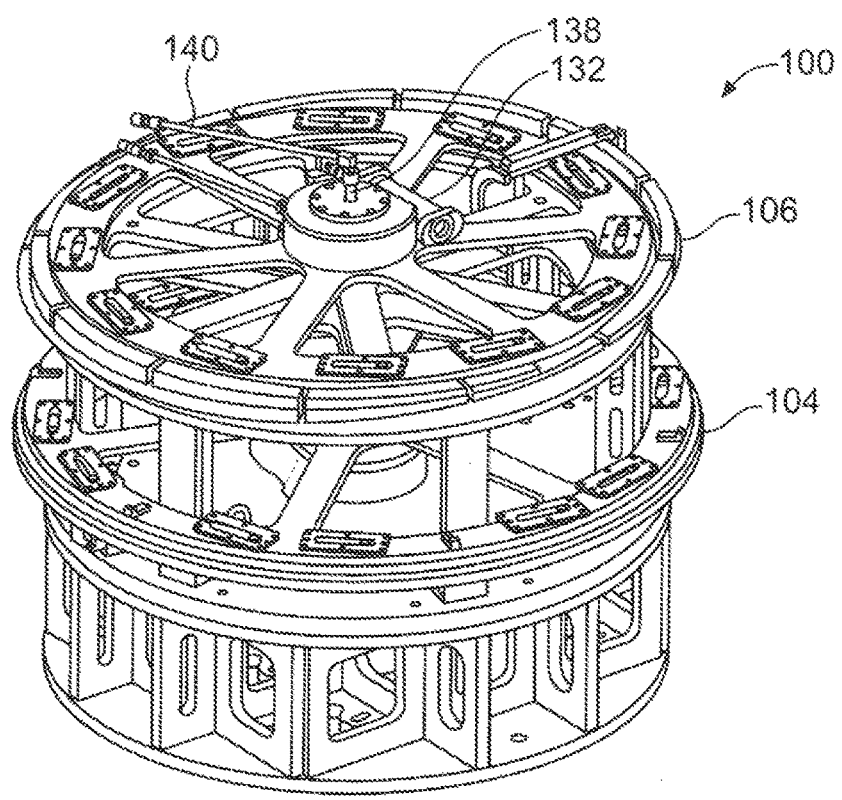
FIG. 2 illustrates a perspective top view of a fixture assembly having a tool engaging an engagement device, according to an embodiment of the present disclosure.

FIG. 2 illustrates a perspective top view of the fixture assembly 100 having the tool 140 engaging the engagement device 132, according to an embodiment of the present disclosure. When the tool 140 is secured to the lead screw 138, for example, the tool 140 may be manually rotated between positions that vary the height of the upper component-securing sub-assembly 106 in relation to the lower component-securing sub-assembly 104. The engagement devices 132 of both the lower and upper component-securing sub-assemblies 104 and 106 (such as the slew ring bearings 136) may be engaged by the tool 140 in order to selectively move the component engaging members 122 between securing and retracted positions. Alternatively, each of the engagement devices 132 and the lead screw 138 may be operatively connected to one or more motors, such as one or more servo motors, which may be operated to automatically engage the engagement devices 132 to rotate the upper rings 110 and 120 relative to the bases 108 and 118, respectively, and the lead screw 138 between various positions.

Figure 3:
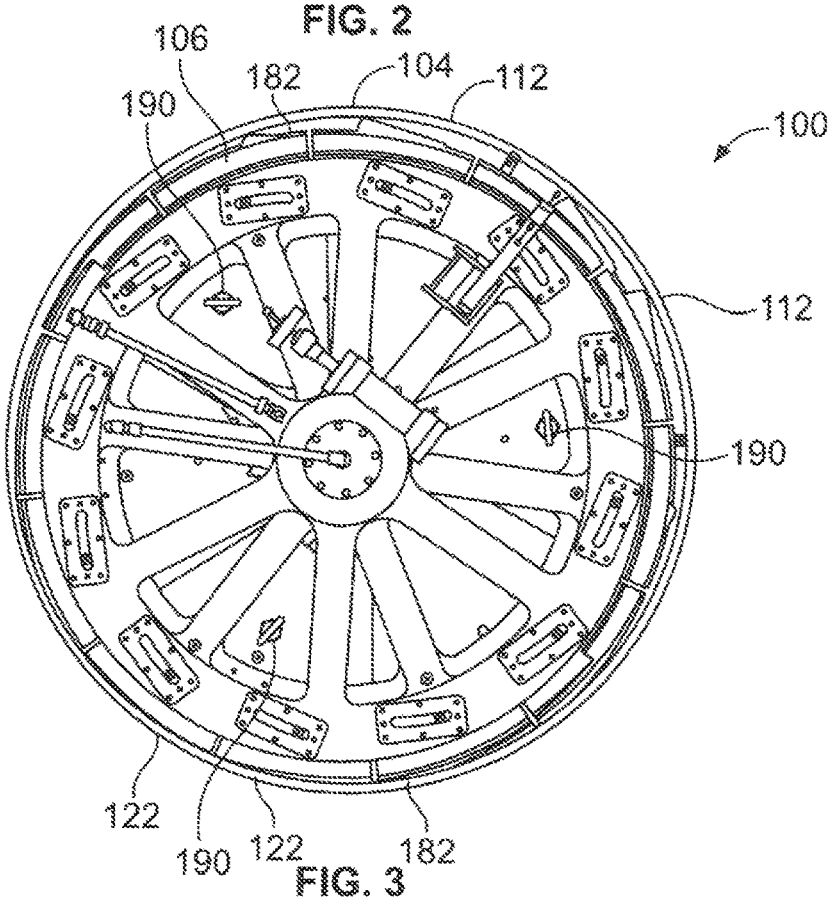
FIG. 3 illustrates a top plan view of a fixture assembly, according to an embodiment of the present disclosure.

FIG. 3 illustrates a top plan view of the fixture assembly 100, according to an embodiment of the present disclosure. As shown, the component engaging members 112 of the lower component-securing sub-assembly 104 may reside in a first plane that may be horizontal, for example, while the component engaging members 122 of the upper component-securing sub-assembly 106 may reside in a second plane that is not parallel to the first plane. Each of the bases 108 and 118 and the upper rings 110 and 120 may reside within planes that are parallel to one another. The component-engaging members 122 may include outer edge portions that are thicker than interior edge portions in order to orient the arcuate outer gripping members 182 within a plane that differs from that in which the outer gripping members 182 of the component-engaging members 112 reside. As such, the bases 108 and 118, and the upper rings 110 and 120 may be coaxial with one another. Alternatively, the bases 108 and 118 and the upper rings 110 and 120 may not be coaxial with one another.

A plurality of hoist rings 190 may upwardly extend from the support base 102. The hoist rings 190 are configured to be removably connected to hooks, for example, extending from a device or system, such as a crane, which may be used to move the fixture assembly 100.

Figure 4:
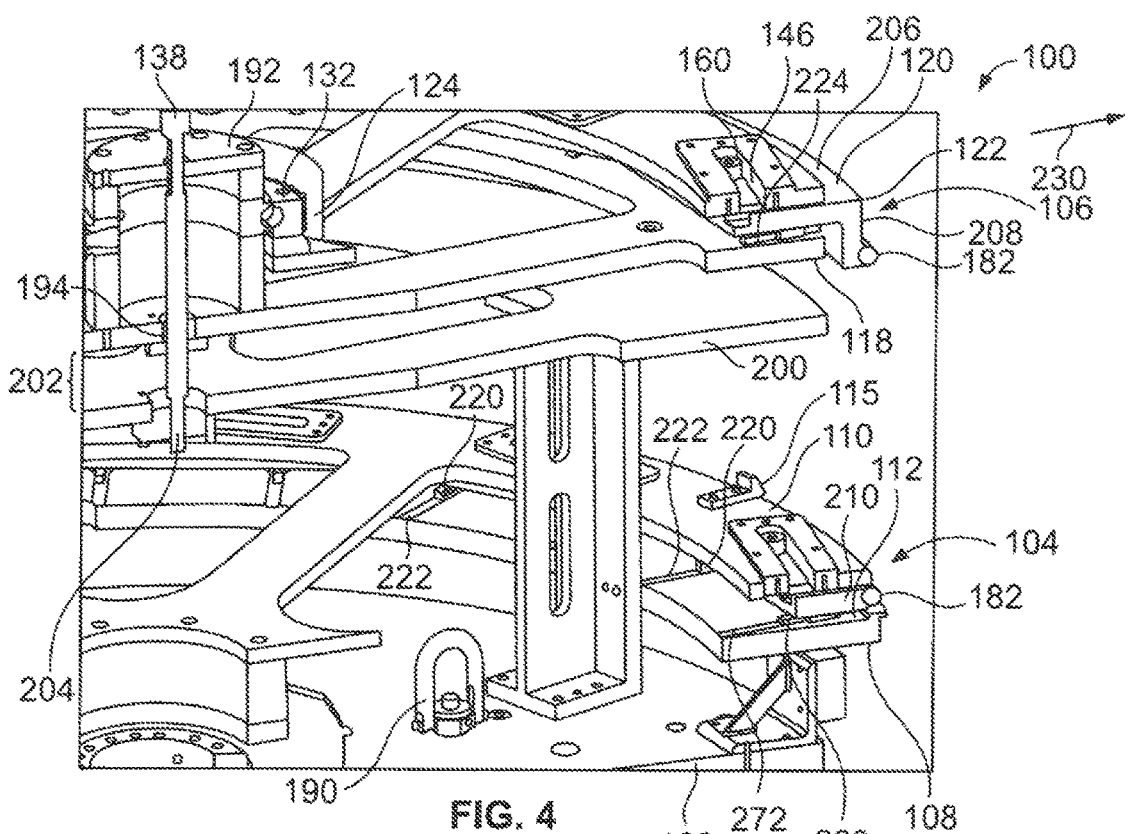
FIG. 4 illustrates a perspective, partial axial cross-sectional view of lower and upper component-securing sub-assemblies of a fixture assembly, according to an embodiment of the present disclosure.

FIG. 4 illustrates a perspective, partial axial cross-sectional view of the respective lower and upper component-securing sub-assemblies 104 and 106 of the fixture assembly 100, according to an embodiment of the present disclosure. For the sake of clarity, only the engagement device 132 of the upper component-securing sub-assembly 106 is shown.

The lead screw 138 may extend through a housing 192 of the upper component-securing sub-assembly 106 and may be fixed to the upper ring 120, such as through a threadable connection or secure joint. Accordingly, as the lead screw 138 is rotated, the upper component-securing assembly 106 translates up or down in relation to the lower component-securing sub-assembly 104, depending on the direction of rotation of the lead screw 138. A portion of the lead screw 138 may be rotatably secured within a bearing 194 secured to the fixed base 118. An outer portion of the housing 192 of the engagement device 132 may be securely fixed to the hub 124 of the upper ring 120. The lead screw 138 may be connected to an interior bearing of the support panel 200. A distance 202 between the support panel 200 and the base 118 may be adjusted, such as through engagement of the lead screw 138 with a tool. For example, the lead screw 138 may be rotatably adjusted within a bearing 204 of the support panel 200 to adjust the distance 202. In this manner, the upper component-securing sub-assembly 106 may be adjusted between different heights.

As shown, the component engaging members 122 may include a flat portion 206 that connects to a downwardly-extending flange 208, having the outer gripping members 182 secured thereto. The height of each flange 208 may vary slightly with that of a neighboring component-engaging member 122 in order to position the outer gripping members 182 in a canted plane. In contrast, the component engaging members 112 may include flat portions 210 having the outer gripping members 182 secured thereto.

As shown with respect to the lower component-securing sub-assembly 104, in particular, each component-engaging member 112 may include one or more carriages 220 that are slidably retained on or within tracks 222, such as recessed grooves, rails, divots, or the like, that radially extend over a top surface of the base 108. Similarly, the component engaging members 122 may include carriages 224 that are slidably retained on or within tracks that radially extend over a top surface of the base 118.

As described above, as the engagement device 132 (such as a slew ring 136 of the engagement device 132) is rotated in a securing direction, the upper ring 120 rotates relative to the base 118. During this rotation, the protuberances 160 slide within the angled channels 146, thereby forcing the component engaging members 122 radially outward in the direction of arrow 230. In order to retract the component engaging members 122, the engagement device 132 is rotated in an opposite direction from the securing direction (that is, the retracting direction), which draws the component-engaging members 122 radially inward. The engagement device 132 of the lower component-securing sub-assembly 104 may be operated in a similar fashion to move the component engaging members 112 between securing and retracted positions.

Figure 5:
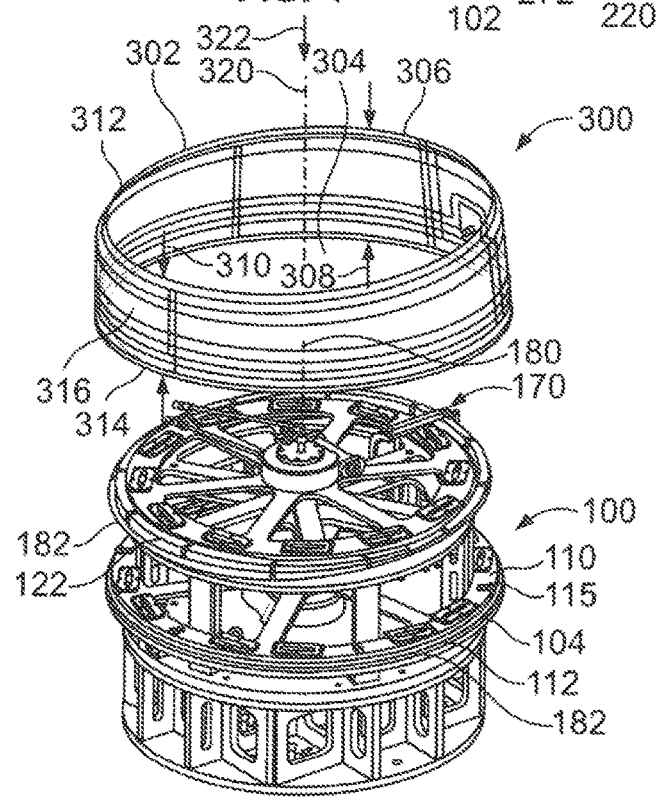
FIG. 5 illustrates a perspective top view of a component positioned above a fixture assembly, according to an embodiment of the present disclosure.

FIG. 5 illustrates a perspective top view of a component, such as an acoustic inlet barrel 300, positioned above the fixture assembly 100, according to an embodiment of the present disclosure. The acoustic inlet barrel 300 may be formed on a mandrel assembly and cured, as described in U.S. patent application Ser. No. 14/588,465, entitled "System and Method of Forming a Component Using a Mandrel Assembly," which was filed Jan. 2, 2015, and is hereby incorporated by reference in its entirety. As shown, the acoustic inlet barrel 300 includes an annular body 302 defining an internal opening 304. The annular body 302 may include an outer wall 306 having a first height 308 that differs from a second height 310. The height of the annular body 302 may gradually transition between the first height 308 and the second height 310. An axial cross-section of the acoustic inlet barrel 300 may be in the shape of an asymmetric hourglass, with an upper rim 312 and lower rim 314 outwardly extending beyond a main body portion 316.

In order to secure the acoustic inlet barrel 300 to the fixture assembly 100, the acoustic inlet barrel 300 is aligned with the fixture assembly 100 such that a central axis 320 aligns with the central axis of the fixture assembly 100. For example, a crane may position and orient the acoustic inlet barrel 300 in relation to the fixture assembly 100. Once aligned, the acoustic inlet barrel 300 is lowered around the fixture assembly 100 in the direction of arrow 322, so that the lower rim 314 is supported on the upper ring 110 of the lower component-securing sub-assembly 104 and supported by the support ledge clips 115. In this position, an interior surface of the lower rim 314 abuts against the outer gripping members 182 of the component engaging members 112 of the lower component-securing sub-assembly 104, while the upper rim 312 abuts against the outer gripping members 182 of the component engaging members 122 of the upper component-securing sub-assembly 104.

The acoustic inlet barrel 300 may be rotated in relation to the fixture assembly 100 until the indexer 170 securely engages a portion, such as a hole, formed on or in the acoustic inlet barrel 300. When the portion of the acoustic inlet barrel 300 aligns with and connects to the indexer 170, the acoustic inlet barrel 300 is in a proper, registered position with respect to the fixture assembly 100. As such, the indexer 170 may engage the portion to maintain the acoustic inlet barrel 300 in a properly aligned and registered position with respect to the fixture assembly 100. In turn, the fixture assembly 100 may be registered with a machining device or system. Accordingly, after the indexer 170 engages the portion of the acoustic inlet barrel 300, the machining device or system may quickly and efficiently machine portions of the acoustic inlet barrel 300 as the exact orientation of the acoustic inlet barrel 300 and portions thereof are registered and known.

Figure 6:
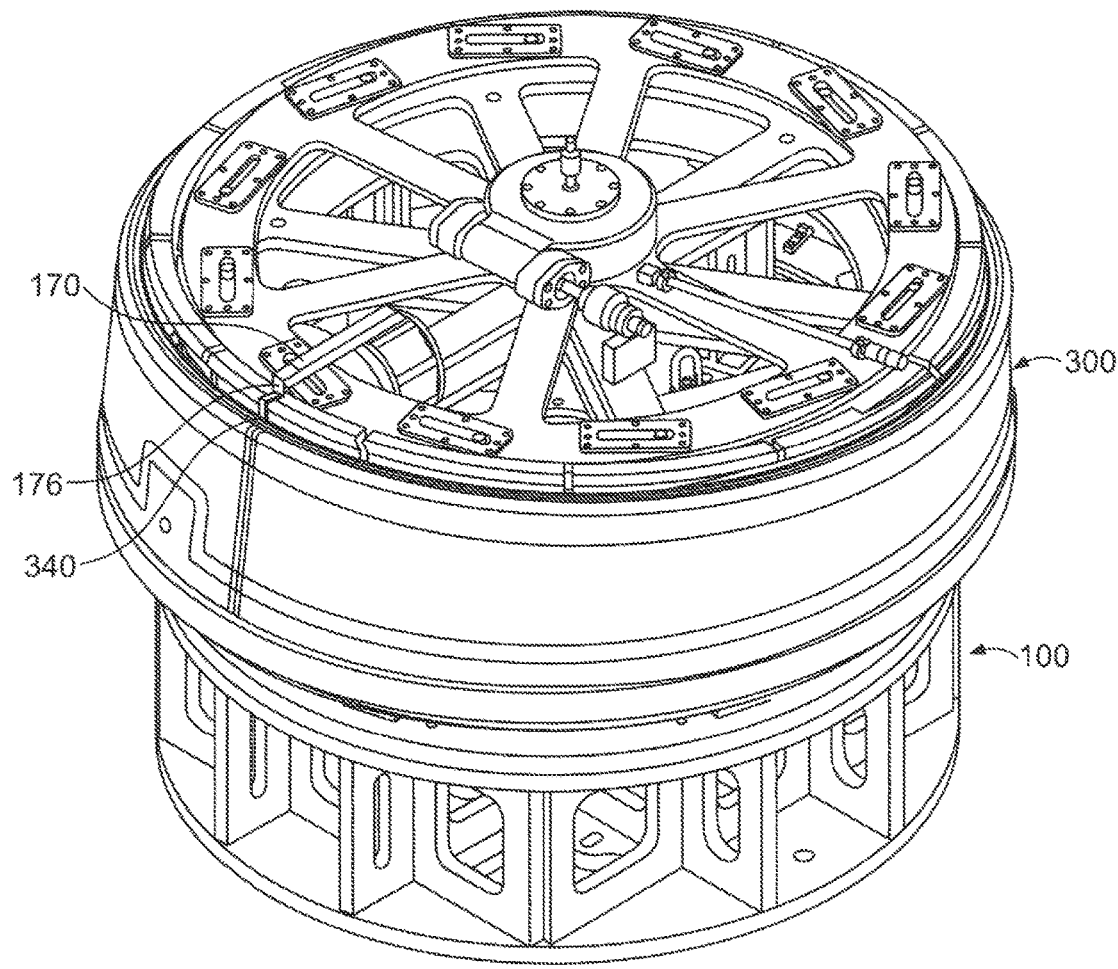
FIG. 6 illustrates a perspective top view of a component positioned around the fixture assembly, according to an embodiment of the present disclosure.

FIG. 6 illustrates a perspective top view of the acoustic inlet barrel 300 positioned around the fixture assembly 100, according to an embodiment of the present disclosure. The clocking member 176, such as a bracket, of the indexer 170 may retain a pin that is positioned within a reciprocal hole 340 formed a portion of the acoustic inlet barrel 300. As such, the indexer 170 securely retains the acoustic inlet barrel 300 in a registered position. The fixture assembly 100 may include additional indexers 170. For example, the upper component-securing sub-assembly 106 may include two or more indexers 170. Further, the lower component-securing sub-assembly 104 may also include one or more indexers. In operation, the indexer 170 is configured to properly index and align a component, such as an acoustic inlet barrel, onto the fixture assembly 100.

Figure 7:
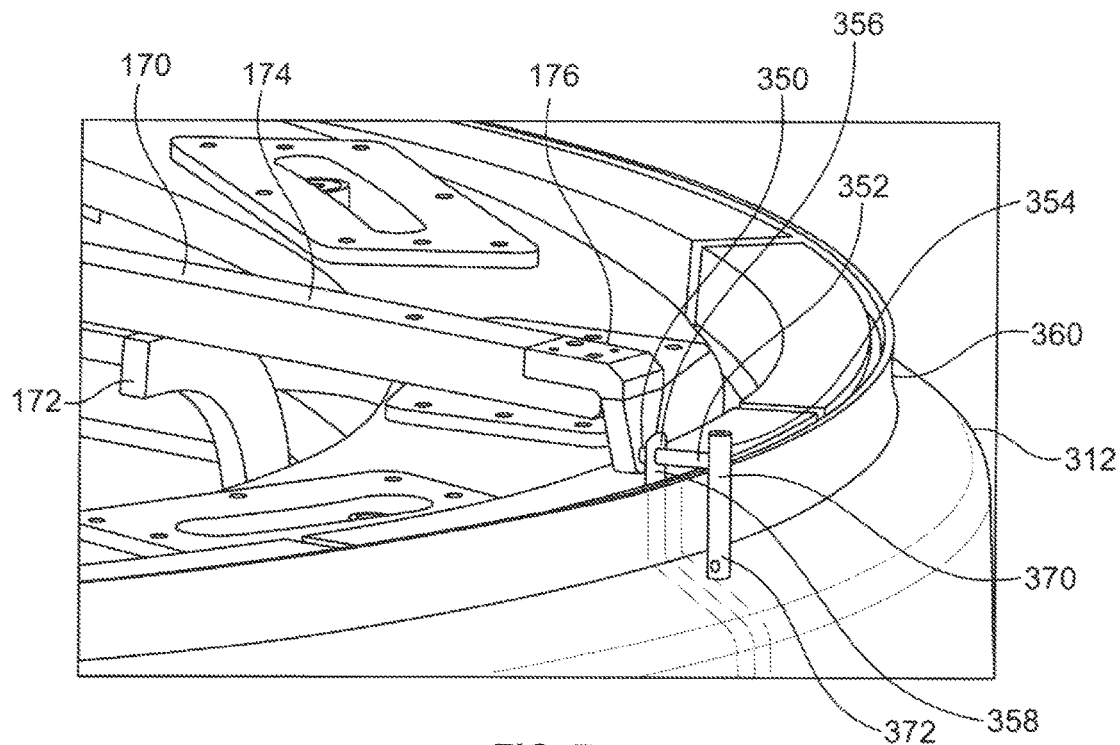
FIG. 7 illustrates a perspective top view of an indexer having a portion retained by a reciprocal feature formed in a component, according to an embodiment of the present disclosure.

FIG. 7 illustrates a perspective top view of the indexer 170 having a portion retained by a reciprocal feature formed in the acoustic inlet barrel 300, according to an embodiment of the present disclosure. The clocking member 176 may be a bracket that extends downwardly from a distal end of the extension beam 174. The clocking member 176 may include a hole 350 that retains an end of a registration pin 352 of a registration member 354. The pin 352 may extend through a hole 356 (such as the hole 340 of FIG. 6) of a locating tab 358 that upwardly extends from a flange 360 extending upwardly from the upper rim 312 of the acoustic inlet barrel 300. A brace 370, such as a post, may extend from the pin 352 and may generally be perpendicular to the pin 352. A lower end 372 of the brace 370 may abut into an upper surface of the upper rim 312. By retaining the pin 352 through the hole 356 of the locating tab 358 of the acoustic inlet barrel 300, the acoustic inlet barrel 300 is positioned in a known relationship with respect to the fixture assembly 100, which may register the acoustic inlet barrel 300 with respect to the fixture assembly 100, and/or a machining device or system.

Figure 8:
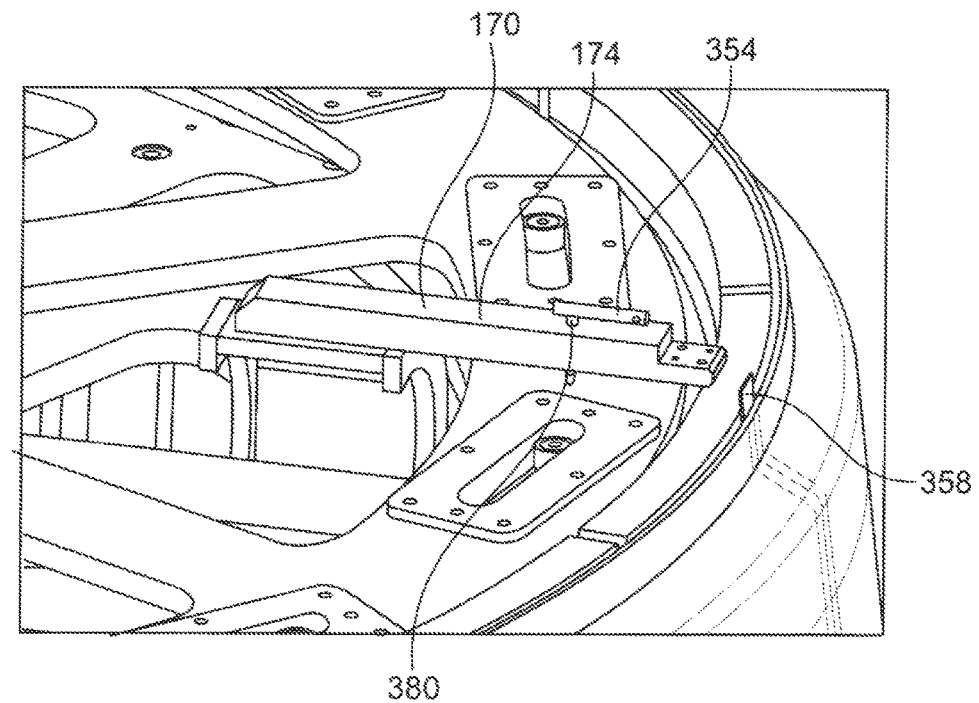
FIG. 8 illustrates a perspective top view of an indexer in a stored position, according to an embodiment of the present disclosure.

FIG. 8 illustrates a perspective top view of the indexer 170 in a stored or stowed position, according to an embodiment of the present disclosure. As shown, the registration member 354 may be removed from the clocking member 176, which may also be removed from a distal end of the extension beam 174. The pin 352 may be retained within a reciprocal channel 380 formed through the extension beam 174. The indexer 170 may be stowed as shown in FIG. 8 during a machining process so as not to interfere with a machining device. Alternatively, the clocking member 174 may not be removed from the extension beam 174. Also, alternatively, the registration member 354 may not be removed from the clocking member 174.

After the acoustic inlet barrel 300 is located and registered with the fixture assembly 100 through the indexer 170, as described above, the engaging devices 132 may be engaged by the tool to extend the component engaging members 112 and 122 (shown in FIG. 1, for example) into a secure abutting relationship with an interior surface of the acoustic inlet barrel 300.

Figure 9:
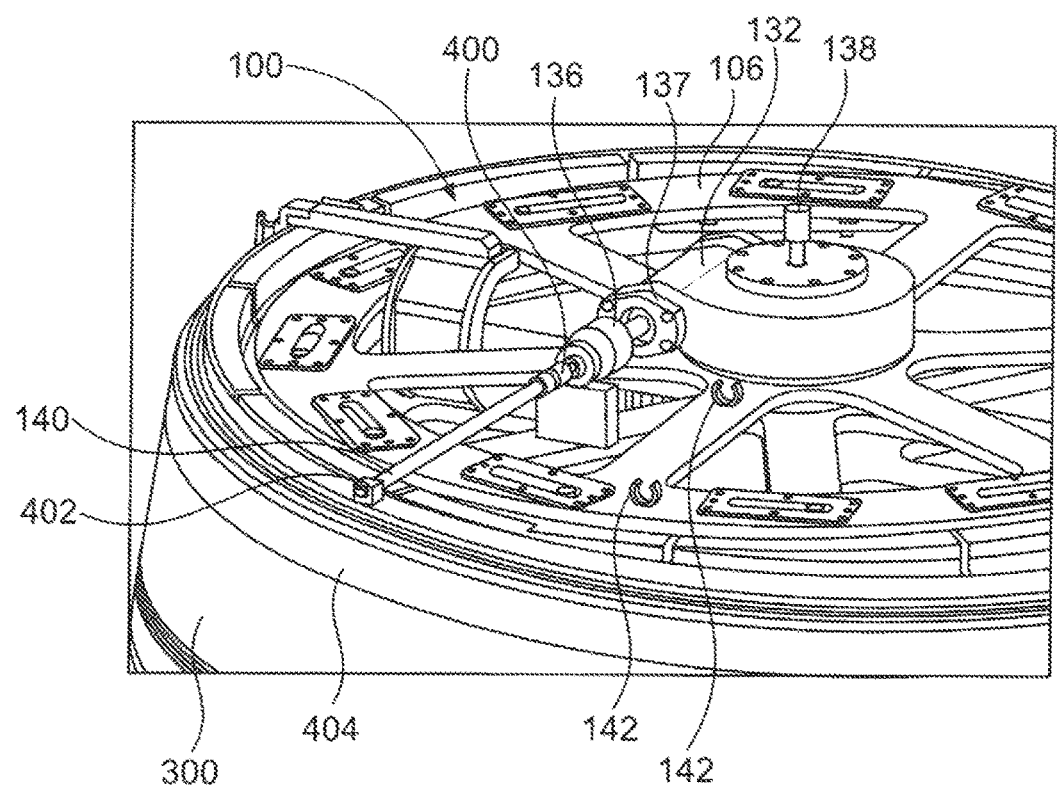
FIG. 9 illustrates a perspective top view of a tool engaging a slew ring bearing of an engaging device of an upper component-securing sub-assembly, according to an embodiment of the present disclosure.
Figure 10:
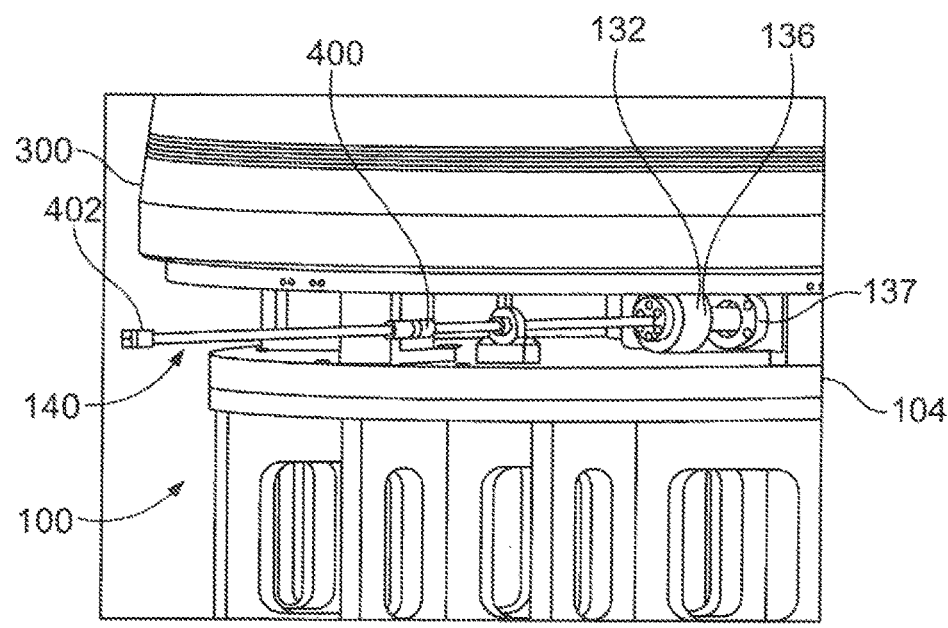
FIG. 10 illustrates a perspective lateral view of a tool engaging a slew ring bearing of an engaging device of a lower component-securing sub-assembly, according to an embodiment of the present disclosure.

FIG. 9 illustrates a perspective top view of the tool 140 engaging the slew ring bearing 136 of the engaging device of the upper component-securing sub-assembly 106, according to an embodiment of the present disclosure. FIG. 10 illustrates a perspective lateral view of the tool 140 engaging the slew ring bearing 136 of the engaging device 132 of the lower component-securing sub-assembly 104, according to an embodiment of the present disclosure. Referring to FIGS. 9 and 10, as shown, the tool 140 has been removed from the clips 142. An operative end 400 of the tool 140 is inserted onto a drive hex, for example, of the slew ring bearing 136, while a handle 402 is rotated in a contacting direction 404. In response, the outer gripping members 182 of the component-engaging members 112 and 122 abut into internal surfaces of the acoustic inlet barrel 300, in order to tightly and securely engage the outer gripping members 182 into an interior surface of the acoustic inlet barrel 300.

Figure 11:
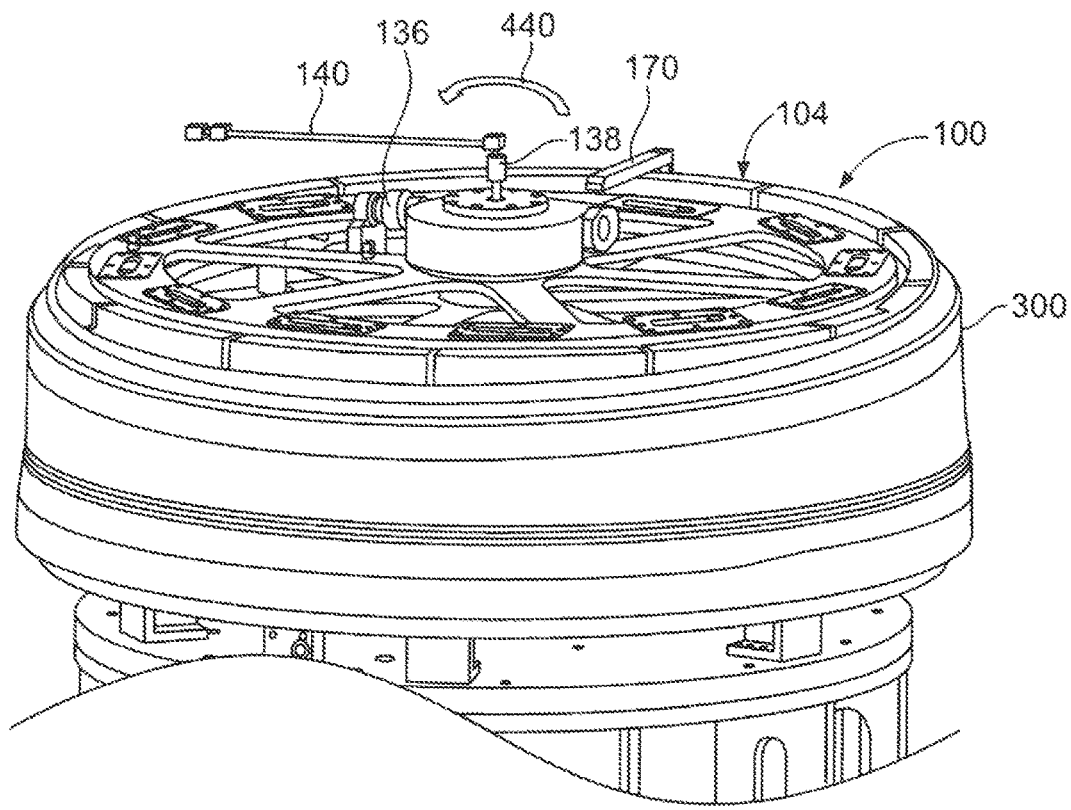
FIG. 11 illustrates a perspective top view of a tool engaging a lead screw of an upper component-securing sub-assembly, according to an embodiment of the present disclosure.

FIG. 11 illustrates a perspective top view of the tool 140 engaging the lead screw 138 of the upper component-securing sub-assembly 106, according to an embodiment of the present disclosure. As the tool 140 is torqued in a direction denoted by arc 440, the height of the upper component-securing assembly 106 may be adjusted. The tool 140 may be engaged in such a manner before or after the acoustic inlet barrel is positioned around the fixture assembly 100.

As the tool 140 engages and is torqued in relation to the slew ring bearings 136 (as described above with respect to FIG. 9), the outer gripping members 182 of the component-engaging members 122 radially and outwardly extend and abut into an interior surface of the acoustic inlet barrel 300. As such, the outer gripping members 182 tightly and securely abut into the acoustic inlet barrel 300 and brace the acoustic inlet barrel 300 into a secure position that minimizes or otherwise reduces any tolerance therebetween. As such, the acoustic inlet barrel 300 is securely retained by the fixture assembly 100 and ready to be machined by a machining system or device. After the component-engaging members 112 and 122 are moved into a tight securing relationship with interior surfaces of the acoustic inlet barrel 300, but before commencement of the machining process, the indexer 170 may be removed from the acoustic inlet barrel 300 (so as not to interfere with the machining system or devices).

After the machining operation is complete, the tool 140 is used to rotate the slew ring bearings 136 in an opposite direction (for example, a retracting direction) to release the acoustic inlet barrel 300 from a secure connection with the fixture assembly 100. The slew ring bearings 136 may be engaged to release the acoustic inlet barrel 300 from the fixture assembly 100. The acoustic inlet barrel 300 may then be removed from the fixture assembly 100, such as through an extractor, crane, or the like.

Figure 12:
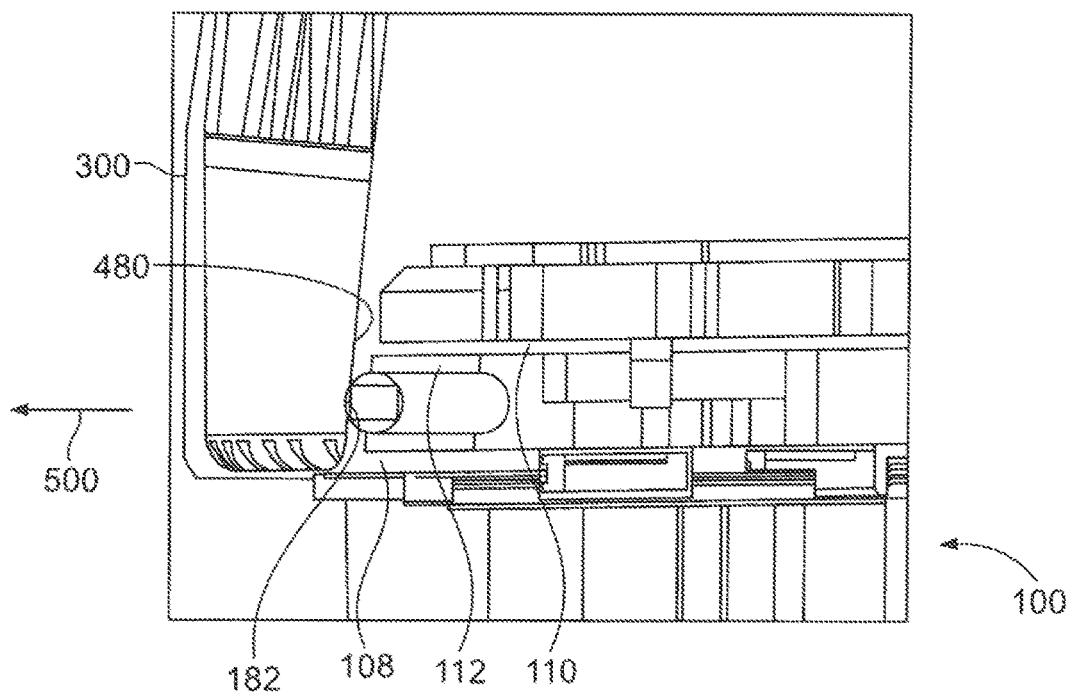
FIG. 12 illustrates a partial cross-sectional view of a lower component-securing sub-assembly securely engaging an interior surface of a component, according to an embodiment of the present disclosure.

FIG. 12 illustrates a partial cross-sectional view of the lower component-securing sub-assembly 104 securely engaging an interior surface 480 of the acoustic inlet barrel 300, according to an embodiment of the present disclosure. As described above, as the slew ring bearing of the engaging device of the lower component-securing sub-assembly 104 is rotated in a securing direction, the component-engaging members 112 radially extend outwardly in the direction of arrow 500, thereby securely abutting and bracing into the interior surface 480. While the lower component-securing sub-assembly 104 is shown in FIG. 12, the upper component-securing sub-assembly 106 (shown in FIG. 1, for example) operates in a similar fashion.

Referring to FIGS. 1-12, each of the engaging devices 132 may include torque limiters (such as the torque limiters 137 shown in FIGS. 9 and 10) that limit the amount of torque that may be applied to the slew ring bearings 136, in order to prevent the component-engaging members 112 and 122 from radially and outwardly extending to a point that would otherwise damage the acoustic inlet barrel 300. After the acoustic inlet barrel 300 is indexed to and securely connected to the fixture assembly 100, a machining system may be used to machine portions of the acoustic inlet barrel 300.

Figure 13:
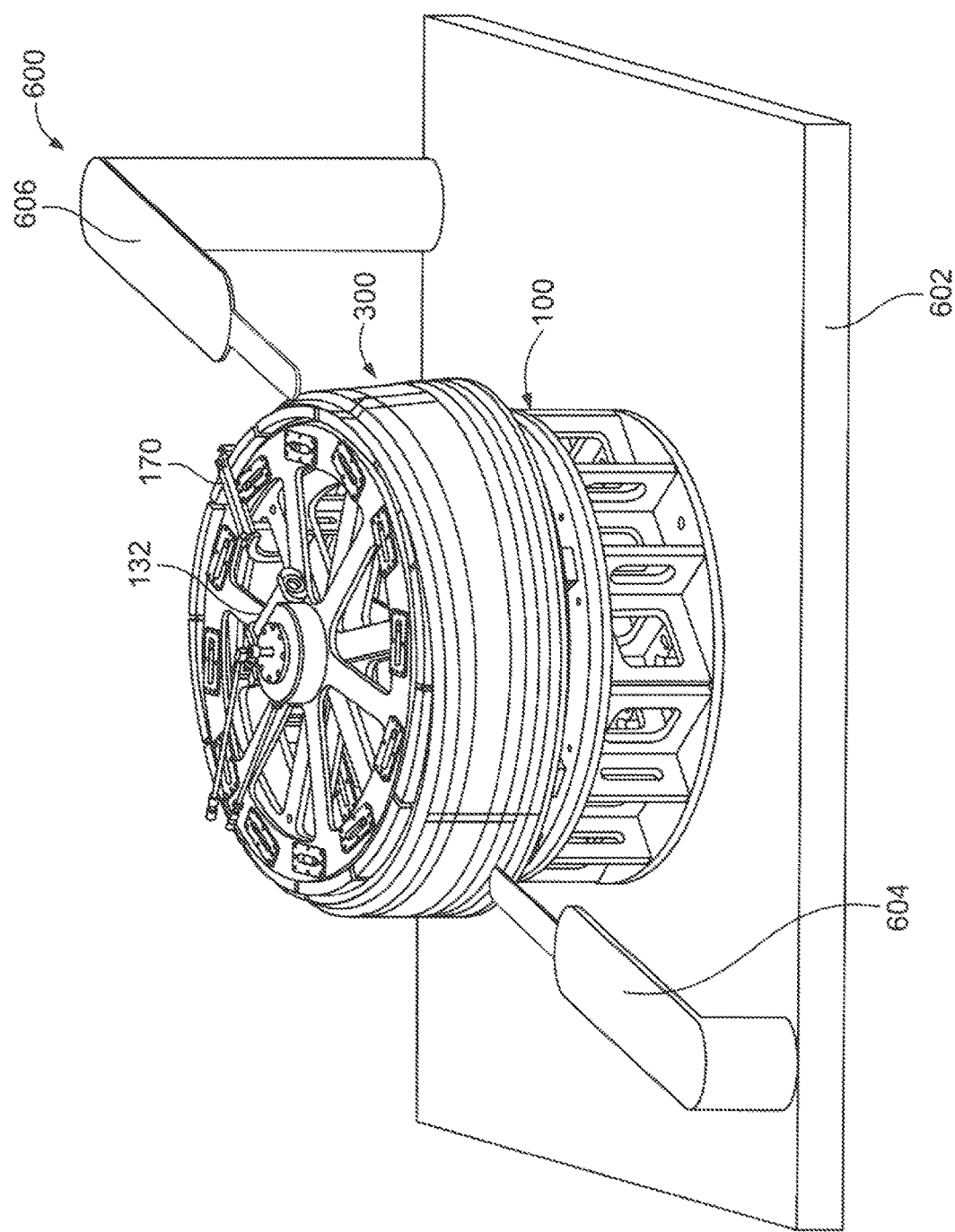
FIG. 13 illustrates a perspective top view of a machining system operating on a component that is securely retained by a fixture assembly, according to an embodiment of the present disclosure.

FIG. 13 illustrates a perspective top view of a machining system 600 operating on the acoustic inlet barrel 300 that is securely retained by the fixture assembly 100, according to an embodiment of the present disclosure. The machining system 600 may include a gantry 602 and one or more machining device 604, such as tools configured to cut, mill, shave, perforate, smooth, and/or the like. Because the exact orientation of the acoustic inlet barrel 300 in relation to the fixture assembly 100 is known (through the indexer 170 engaging the acoustic inlet barrel 300, as described above), a machining operation may be quickly and efficiently conducted, such as through a machining program that correlates specific machining operations with respect to specific positions of the acoustic inlet barrel 300. Further, before the machining operation begins, the engaging devices 132 are operated to provide a secure bracing relationship between the component engaging members 112 and 122 (shown in FIG. 1, for example) and the acoustic inlet barrel 300 to minimize or otherwise reduce slack, gaps or tolerances between the acoustic inlet barrel 300 and the outer gripping members 182 of the component engaging members 112 and 122.

As described above, the fixture assembly 100 may include lower and upper component-securing sub-assemblies 104 and 106. Alternatively, the fixture assembly 100 may include just a single component-securing sub-assembly 104 or 106. Also, alternatively, the fixture assembly 100 may include other component-securing sub-assemblies in addition to the lower and upper component-securing sub-assemblies 104 and 106.

Figure 14:
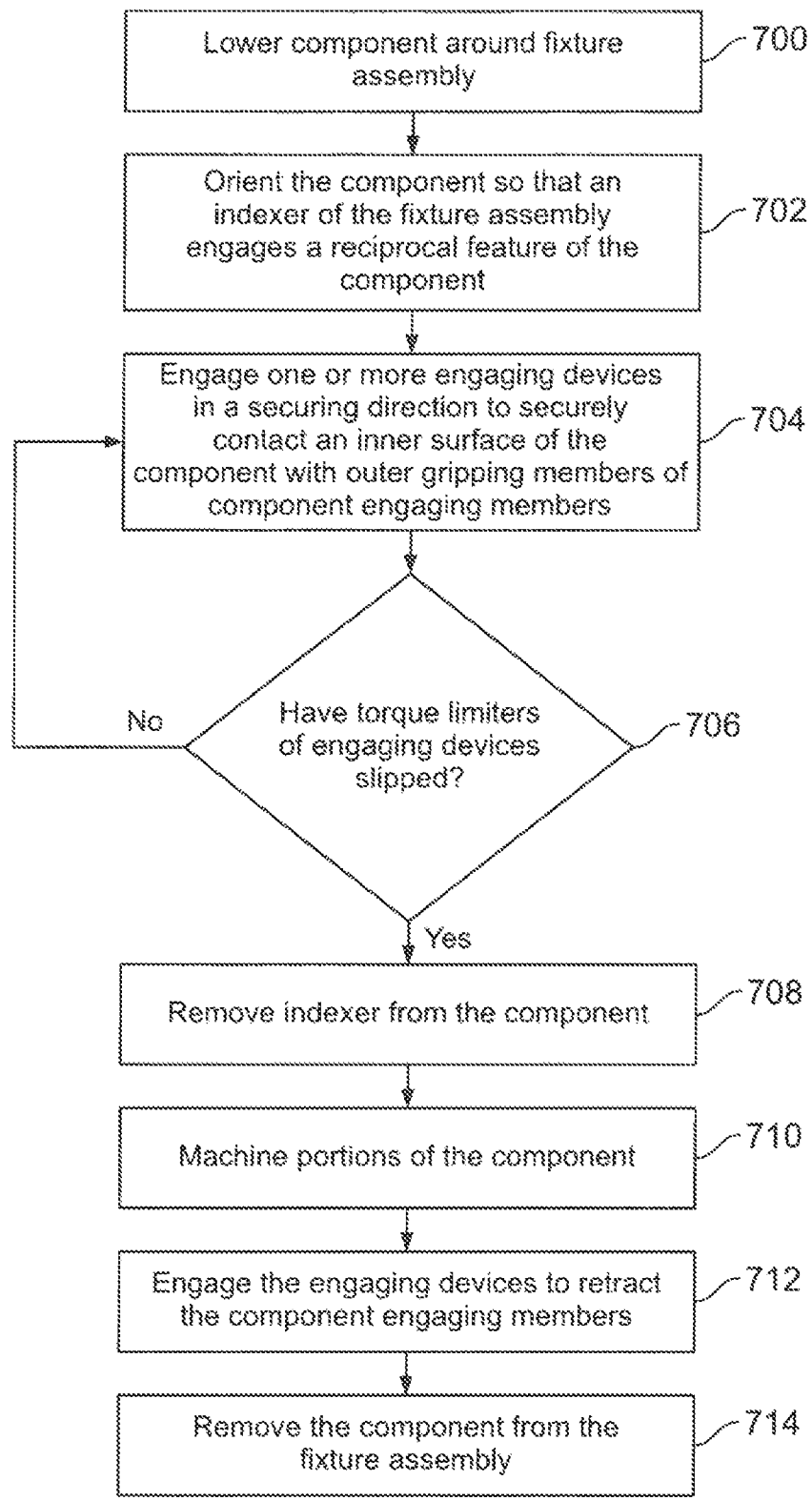
FIG. 14 illustrates a flow chart of a method of machining a component, according to an embodiment of the present disclosure.

FIG. 14 illustrates a flow chart of a method of machining a component (such as an acoustic inlet barrel), according to an embodiment of the present disclosure. The method begins at 700, at which a component is lowered around a fixture assembly. After the component is positioned around the fixture assembly, at 702 the component is oriented in relation to the fixture assembly (such as through rotation) so that an indexer of the fixture assembly engages a reciprocal feature of the component. For example, the indexer may include a registration pin that is inserted into a reciprocal hole formed through a tab of the component.

At 704, one or more engaging devices are engaged in a securing direction to securely contact an inner surface of the component with outer rims of component engaging members. For example, the engaging devices may be torqued in a securing direction, such as with a tool, which causes the component engaging members to radially and outwardly extend, thereby urging outer rims thereof to abut into interior surfaces of the component.

At 706, it may be determined if torque limiters of engaging devices have slipped. If not, the process returns to 704. If so, then the slippage indicates that the engaging devices have been torqued to their most secure positions (the torque limiters are configured to prevent further radial expansion of the component engaging members), and the component is securely retained by the fixture assembly. Alternatively, step 706 may be omitted, and the engaging devices may be engaged to securely retain component to the fixture assembly.

At 708, the indexer may be removed from the component. The secure engagement between the component engaging members and the component ensures that the component is securely retained in the registered position, as initially achieved through the indexer engaging the reciprocal feature of the component.

At 710, portions of the component may then be removed. At 712, the engaging devices are then engaged to retract the component engaging members so that the component is no longer securely retained by the fixture assembly. At 714, the component may then be removed from the fixture assembly, such as by a crane or extractor.

Figure 15:
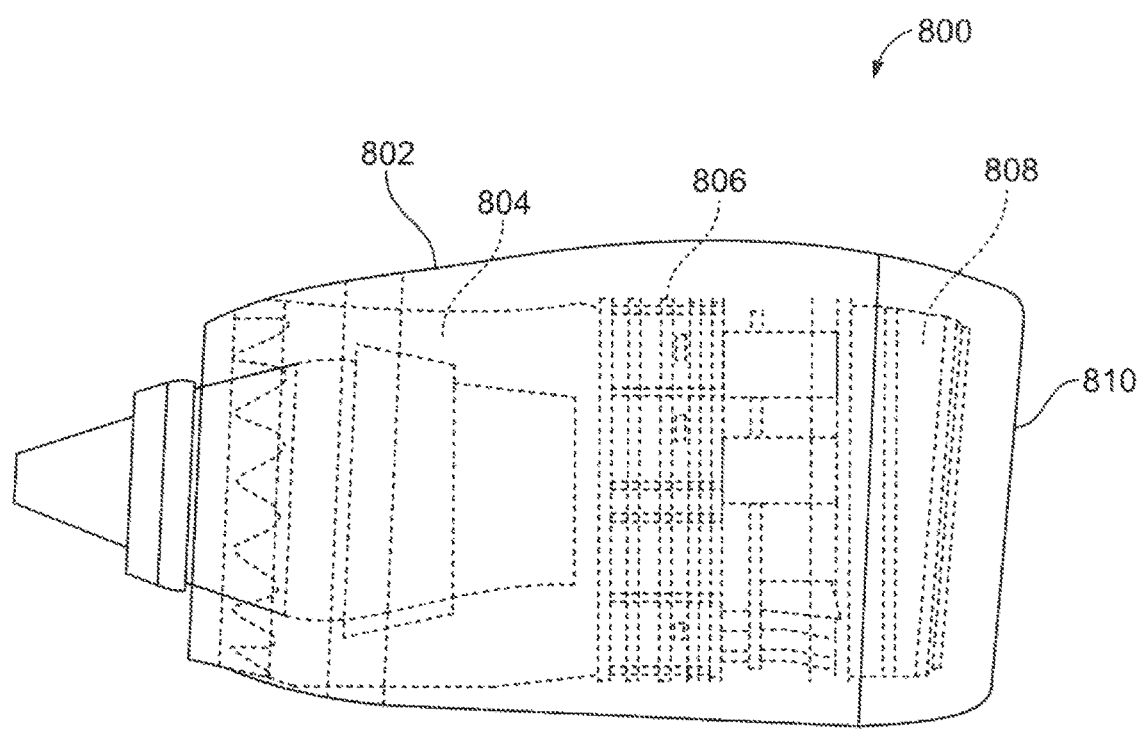
FIG. 15 illustrates an internal view of an aircraft engine, according to an embodiment of the present disclosure.

FIG. 15 illustrates an internal view of an aircraft engine 800, according to an embodiment of the present disclosure. The aircraft engine 800 includes a main housing 802 that retains a fan 804, an engine 806, and a component 808, such as an acoustic inlet barrel, positioned proximate to an air intake inlet 810 of the aircraft engine 800. The component 808 may be secured to a fixture assembly and machined before being secured within the main housing 502, such as described above.

As described above, embodiments of the present disclosure provide a fixture assembly that is configured to securely retain a component, such as an acoustic inlet barrel, during a machining process. Embodiments of the present disclosure provide a fixture assembly that is configured to precisely, quickly, and repeatably hold or otherwise retain a complex, asymmetric hour-glass shaped component. The fixture assembly may include upper and lower coaxially-aligned expanding wheels or rings having a fixed portion and an expanding portion, which may be configured to radially expand in relation to the fixed portion. The expanding portion may be configured to move in relation to the fixed portion by way of a cam interface, for example. The expanding portion may include gripping members, each of which may be tailored to a shape of an inner surface of a cylindrical component, such as an acoustic inlet barrel. Each gripping member may include an outer contacting portion that may be formed of a constant force-exerting material, such as a rubber or an elastomeric material. Outer contacting portions of each expanding wheel may be positioned in non-parallel planes, for example.

The fixture assembly may also include one or more indexing features. The fixture assembly, which retains the component, may be positioned on a numerically-controlled system, which may include a bed, gantry, or the like. The indexing feature(s) allow the numerically-controlled system to register the component in space and determine the exact position of surfaces to be machined.

Embodiments of the present disclosure are configured to accurately support and retain a complex-shaped component for post-autoclave machining. Embodiments decrease labor time and costs, and therefore increase a production rate of a component, such as an acoustic inlet barrel.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A fixture assembly configured to securely retain a component, the fixture assembly comprising:
at least one component-securing sub-assembly configured to be selectively positioned between a retracted position and a securing position, wherein the at least one component-securing sub-assembly securely retains the component in the securing position, wherein the at least one component-securing sub-assembly includes a plurality of component-securing members having outer gripping members that are configured to securely abut into an interior surface of the component in the securing position, wherein the at least one component-securing sub-assembly includes a fixed base connected to a rotatable ring, wherein the plurality of component-securing members are moveably secured between the fixed base and the rotatable ring, and wherein rotational movement of the rotatable ring causes the component-securing members to radially move.

2. The fixture assembly of claim 1, wherein the at least one component-securing sub-assembly comprises:
   a lower component-securing sub-assembly that is configured to securely engage a lower portion of the component in the securing position; and
   an upper component-securing sub-assembly that is configured to securely engage an upper portion of the component in the securing position.

3. The fixture assembly of claim 2, wherein at least portions of the component-securing members of the lower component-securing sub-assembly reside within a first plane, wherein at least portions of the component-securing members of the upper component-securing sub-assembly reside within a second plane, and wherein the first and second planes are non-parallel.

4. The fixture assembly of claim 2, further comprising:
   a support base that supports the lower component-securing sub-assembly and the upper component-securing sub-assembly; and
   one or more support beams upwardly extending from the support base and connected to the upper component-securing sub-assembly, wherein the one or more support beams separate the upper component-securing sub-assembly from the lower component-securing sub-assembly.

5. The fixture assembly of claim 1, wherein the rotatable ring includes a plurality of brackets having longitudinal channels that slidably retain a protuberance of a respective one of the plurality of component-securing members.

6. The fixture assembly of claim 5, wherein each of the plurality of brackets is angled on the rotatable sing, wherein each of the plurality of brackets has first and second ends, and wherein one of the first or second ends is closer to an outer rim of the rotatable ring than the other of the first or second ends.

7. The fixture assembly of claim 1, wherein the at least one component-securing sub-assembly includes an engagement device that is configured to be engaged to move the at least one component securing sub-assembly between the retracted and securing positions.

8. The fixture assembly of claim 7, further comprising at least one tool that is removably secured to a portion of the at least one component-securing sub-assembly, wherein the tool is configured to engage the engagement device.

9. The fixture assembly of claim 1, further comprising an indexer configured to engage a reciprocal feature formed in the component to locate the component in relation to the fixture assembly.

10. The fixture assembly of claim 9, wherein the indexer comprises:
    an extension beam that radially extends from an arcuate cuff secured to a portion of the fixture assembly;
    a clocking member extending from a distal end of the extension beam; and
    a registration pin secured to the clocking member, wherein the registration pin is configured to be retained within a reciprocal hole formed in a portion of the component.

11. A machining system comprising:
    a component;
    a fixture assembly that is configured to securely retain the component, the fixture assembly comprising at least one component-securing sub-assembly configured to be selectively positioned between a retracted position and a securing position, wherein the at least one component-securing sub-assembly securely retains the component in the securing position, wherein the at least one component-securing sub-assembly includes a plurality of component-securing members having outer gripping members that are configured to securely abut into an interior surface of the component in the securing position, wherein the at least one component-securing sub-assembly includes a fixed base connected to a rotatable ring, wherein the plurality of component-securing members are moveably secured between the fixed base and the rotatable ring, and wherein rotational movement of the rotatable ring causes the component-securing members to radially move; and
    one or more machining devices positioned on a gantry, wherein the fixture assembly is positioned on the gantry and the component is securely retained by the fixture assembly when the at least one component-securing sub-assembly is positioned in the securing position.

12. The machining system of claim 11, wherein the at least one component-securing sub-assembly comprises:
    a lower component-securing sub-assembly that is configured to securely engage a lower portion of the component in the securing position; and
    an upper component-securing sub-assembly that is configured to securely engage an upper portion of the component in the securing position.

13. The machining system of claim 11, wherein the at least one component-securing sub-assembly includes an engagement device that is configured to be engaged to move the at least one component securing sub-assembly between the retracted and securing positions.

14. The machining system of claim 11, wherein the fixture assembly further comprises an indexer configured to engage a reciprocal feature formed in the component to locate the component in relation to the fixture assembly.

15. The machining system of claim 14, wherein the indexer comprises:
    an extension beam that radially extends from an arcuate cuff secured to a portion of the fixture assembly;
    a clocking member extending from a distal end of the extension beam; and
    a registration pin secured to the clocking member, wherein the registration pin is configured to be retained within a reciprocal hole formed in a portion of the component.

16. A method of machining a component, the method comprising:
    positioning the component around a fixture assembly;
    engaging one or more engaging devices in a securing direction to securely contact an inner surface of the component with outer gripping members of component engaging members of the fixture assembly;
    removing an indexer from a reciprocal feature of the component after the engaging one or more engaging devices in a securing direction operation;
    machining portions of the component after the removing operation;
    engaging the engaging devices in a retracting direction to retract the component engaging members away from the inner surface of the component; and
    removing the component from the fixture assembly after the component engaging members are retracted.

17. The method of claim 16, wherein each of the engaging operations comprises rotating a rotatable ring in relation to a fixed base, wherein the rotating operation radially moves the component-securing members.

18. The method of claim 16, further comprising removing at least one tool from the fixture assembly, and wherein each of the engaging operations comprises engaging at least one engagement device with the at least one tool.

19. A fixture assembly configured to securely retain a component, the fixture assembly comprising:
  a lower component-securing sub-assembly and an upper component-securing sub-assembly, wherein the lower component-securing sub-assembly and the upper component-securing assembly are configured to be selectively positioned between a retracted position and a securing position, wherein the lower component-securing sub-assembly and the upper component-securing sub-assembly securely retain the component in the securing position, wherein the lower component-securing sub-assembly is configured to securely engage a lower portion of the component in the securing position, wherein the upper component-securing sub-assembly is configured to securely engage an upper portion of the component in the securing position, wherein the lower component-securing sub-assembly and the upper component-securing sub-assembly include a plurality of component-securing members having outer gripping members that are configured to securely abut into an interior surface of the component in the securing position;
  a support base that supports the lower component-securing sub-assembly and the upper component-securing sub-assembly; and
  one or more support beams upwardly extending from the support base and connected to the upper component-securing sub-assembly, wherein the one or more support beams separate the upper component-securing sub-assembly from the lower component-securing sub-assembly.

20. The fixture assembly of claim 19, wherein at least portions of the component-securing members of the lower component-securing sub-assembly reside within a first plane, wherein at least portions of the component-securing members of the upper component-securing sub-assembly reside within a second plane, and wherein the first and second planes are non-parallel.

21. The fixture assembly of claim 20, further comprising:
  a support base that supports the lower component-securing sub-assembly and the upper component-securing sub-assembly; and
  one or more support beams upwardly extending from the support base and connected to the upper component-securing sub-assembly, wherein the one or more support beams separate the upper component-securing sub-assembly from the lower component-securing sub-assembly.

22. The fixture assembly of claim 19, wherein the at least one component-securing sub-assembly includes an engagement device that is configured to be engaged to move the at least one component securing sub-assembly between the retracted and securing positions.

23. The fixture assembly of claim 22, further comprising at least one tool that is removably secured to a portion of the at least one component-securing sub-assembly, wherein the tool is configured to engage the engagement device.

24. The fixture assembly of claim 19, further comprising an indexer configured to engage a reciprocal feature formed in the component to locate the component in relation to the fixture assembly.

25. The fixture assembly of claim 24, wherein the indexer comprises:
  an extension beam that radially extends from an arcuate cuff secured to a portion of the fixture assembly;
  a clocking member extending from a distal end of the extension beam; and
  a registration pin secured to the clocking member, wherein the registration pin is configured to be retained within a reciprocal hole formed in a portion of the component.

26. A fixture assembly configured to securely retain a component, the fixture assembly comprising:
  at least one component-securing sub-assembly configured to be selectively positioned between a retracted position and a securing position, wherein the at least one component-securing sub-assembly securely retains the component in the securing position, wherein the at least one component-securing sub-assembly includes: (a) a plurality of component-securing members having outer gripping members that are configured to securely abut into an interior surface of the component in the securing position, and (b) an engagement device that is configured to be engaged to move the at least one component securing sub-assembly between the retracted and securing positions; and
  at least one tool that is removably secured to a portion of the at least one component-securing sub-assembly, wherein the tool is configured to engage the engagement device.

27. The fixture assembly of claim 26, wherein the at least one component-securing sub-assembly comprises:
  a lower component-securing sub-assembly that is configured to securely engage a lower portion of the component in the securing position; and
  an upper component-securing sub-assembly that is configured to securely engage an upper portion of the component in the securing position.

28. The fixture assembly of claim 27, wherein at least portions of the component-securing members of the lower component-securing sub-assembly reside within a first plane, wherein at least portions of the component-securing members of the upper component-securing sub-assembly reside within a second plane, and wherein the first and second planes are non-parallel.

29. The fixture assembly of claim 26, further comprising an indexer configured to engage a reciprocal feature formed in the component to locate the component in relation to the fixture assembly.

30. The fixture assembly of claim 29, wherein the indexer comprises:
  an extension beam that radially extends from an arcuate cuff secured to a portion of the fixture assembly;
  a clocking member extending from a distal end of the extension beam; and
  a registration pin secured to the clocking member, wherein the registration pin is configured to be retained within a reciprocal hole formed in a portion of the component.

31. A fixture assembly configured to securely retain a component, the fixture assembly comprising:
  at least one component-securing sub-assembly configured to be selectively positioned between a retracted position and a securing position, wherein the at least one component-securing sub-assembly securely retains the component in the securing position, wherein the at least one component-securing sub-assembly includes a plurality of component-securing members having outer gripping members that are configured to securely abut into an interior surface of the component in the securing position; and an indexer configured to engage a reciprocal feature formed in the component to locate the component in relation to the fixture assembly.

32. The fixture assembly of claim 31, wherein the indexer comprises:
an extension beam that radially extends from an arcuate cuff secured to a portion of the fixture assembly;
a clocking member extending from a distal end of the extension beam; and
a registration pin secured to the clocking member, wherein the registration pin is configured to be retained within a reciprocal hole formed in a portion of the component.

33. The fixture assembly of claim 31, wherein the at least one component-securing sub-assembly comprises:
a lower component-securing sub-assembly that is configured to securely engage a lower portion of the component in the securing position; and
an upper component-securing sub-assembly that is configured to securely engage an upper portion of the component in the securing position.

34. The fixture assembly of claim 32, wherein at least portions of the component-securing members of the lower component-securing sub-assembly reside within a first plane, wherein at least portions of the component-securing members of the upper component-securing sub-assembly reside within a second plane, and wherein the first and second planes are non-parallel.

35. A machining system comprising:
a component;
a fixture assembly that is configured to securely retain the component, the fixture assembly comprising: (a) at least one component-securing sub-assembly configured to be selectively positioned between a retracted position and a securing position, wherein the at least one component-securing sub-assembly securely retains the component in the securing position, wherein the at least one component-securing sub-assembly includes a plurality of component-securing members having outer gripping members that are configured to securely abut into an interior surface of the component in the securing position, and (b) an indexer configured to engage a reciprocal feature formed in the component to locate the component in relation to the fixture assembly; and
one or more machining devices positioned on a gantry, wherein the fixture assembly is positioned on the gantry and the component is securely retained by the fixture assembly when the at least one component-securing sub-assembly is positioned in the securing position.

36. The machining system of claim 35, wherein the indexer comprises:
an extension beam that radially extends from an arcuate cuff secured to a portion of the fixture assembly;
a clocking member extending from a distal end of the extension beam; and
a registration pin secured to the clocking member, wherein the registration pin is configured to be retained within a reciprocal hole formed in a portion of the component.

37. The machining system of claim 35, wherein the at least one component-securing sub-assembly comprises:
a lower component-securing sub-assembly that is configured to securely engage a lower portion of the component in the securing position; and
an upper component-securing sub-assembly that is configured to securely engage an upper portion of the component in the securing position.

38. The machining system of claim 35, wherein the at least one component-securing sub-assembly includes an engagement device that is configured to be engaged to move the at least one component securing sub-assembly between the retracted and securing positions.

* * * * *